(12) United States Patent
Walravens et al.

(10) Patent No.: US 8,865,095 B2
(45) Date of Patent: Oct. 21, 2014

(54) PROCESS FOR PRODUCING SODIUM BICARBONATE

(71) Applicant: Solvay SA, Brussels (BE)

(72) Inventors: Hugo Walravens, Meise (BE); Kurt Allen, Green River, WY (US); Thoi-Dai Chau, Bad Hoenningen (DE); Alain Vandendoren, Brussels (BE)

(73) Assignee: Solvay SA, Brussels (BE)

( * ) Notice: Subject to any disclaimer, the term of this patent is extended or adjusted under 35 U.S.C. 154(b) by 46 days.

(21) Appl. No.: 13/716,691

(22) Filed: Dec. 17, 2012

(65) Prior Publication Data

US 2013/0156663 A1    Jun. 20, 2013

Related U.S. Application Data

(60) Provisional application No. 61/578,160, filed on Dec. 20, 2011, provisional application No. 61/578,162, filed on Dec. 20, 2011.

(51) Int. Cl.
| | | |
|---|---|---|
| *C22B 26/00* | (2006.01) | |
| *C22B 26/10* | (2006.01) | |
| *C01D 7/10* | (2006.01) | |

(52) U.S. Cl.
CPC .. *C22B 26/10* (2013.01); *C01D 7/10* (2013.01)
USPC ........ 423/189; 423/190; 423/206.2; 423/421; 423/422

(58) Field of Classification Search
None
See application file for complete search history.

(56) References Cited

U.S. PATENT DOCUMENTS

| | | | |
|---|---|---|---|
| 2,926,995 A | 3/1960 | Mod et al. | |
| 3,751,560 A | 8/1973 | Neumann | |
| 3,944,474 A | 3/1976 | Verlaeten | |
| 5,588,713 A | 12/1996 | Stevenson | |
| 5,618,504 A | 4/1997 | Delling et al. | |
| 5,624,647 A | 4/1997 | Zolotoochin et al. | |
| 5,989,505 A | 11/1999 | Zolotoochin et al. | |
| 7,507,388 B2 | 3/2009 | Ceylan et al. | |
| 2003/0017099 A1 | 1/2003 | Kurtz | |
| 2003/0143149 A1 | 7/2003 | Braman et al. | |
| 2004/0002698 A1 | 1/2004 | Hua Xiao et al. | |
| 2004/0057892 A1 | 3/2004 | Kurtz | |
| 2006/0193765 A1* | 8/2006 | Nakashima et al. | 423/422 |
| 2009/0238740 A1* | 9/2009 | Sensarma et al. | 423/206.2 |
| 2009/0291038 A1 | 11/2009 | Davoine et al. | |
| 2010/0066153 A1 | 3/2010 | Day et al. | |
| 2011/0112298 A1* | 5/2011 | Toyoda et al. | 546/48 |
| 2011/0274599 A1 | 11/2011 | Hughes et al. | |

FOREIGN PATENT DOCUMENTS

| | | |
|---|---|---|
| EP | 2078697 A1 | 7/2009 |
| GB | 2034294 A | 6/1980 |
| WO | WO 2009138403 A1 | 11/2009 |
| WO | WO 2011112298 A2 | 9/2011 |
| WO | WO 2011138005 A1 | 11/2011 |

OTHER PUBLICATIONS

U.S. Appl. No. 12/991,350, Perrine Davoine, et al, Nov. 5, 2010.
U.S. Appl. No. 12/126,651, Perrine Davoine, et al, May 28, 2008.
U.S. Appl. No. 13/620,422, Perrine Davoine, et al, Sep. 14, 2012.
U.S. Appl. No. 13/716,581, Hugo Walravens, et al, Dec. 17, 2012.

* cited by examiner

*Primary Examiner* — Steven Bos
(74) *Attorney, Agent, or Firm* — Beatrice C. Ortego (57) ABSTRACT

A process for producing sodium bicarbonate from a sodium carbonate bearing stream (A) comprising sodium carbonate and an alkaline metal salt impurity at a concentration $C_i(A)$, comprising: a) mixing the stream (A) with part of a stream (B), b) bicarbonating the resulting mixed stream with a gas comprising $CO_2$ to produce an aqueous suspension comprising sodium bicarbonate crystals (F), c) separating the sodium bicarbonate crystals (F) from the aqueous liquor (G), d) partly debicarbonating at least part of (G) and removing part of the water of (G) to obtain the stream (B) with the salt impurity at a concentration $C_f(B)$, e) recycling part of the stream (B) to step a) so that the ratio of the concentrations $C_f(B)/C_i(A)$ of the impurity is at least: 1.4, and f) removing the remainder (I) of the stream (B) or the remainder (J) of the liquor (G) to be further processed.

21 Claims, 2 Drawing Sheets

PROCESS FOR PRODUCING SODIUM BICARBONATE

CROSS-REFERENCE TO RELATED APPLICATIONS

This application claims priority to U.S. provisional applications Nos. 61/578,160 and 61/578,162, both filed on Dec. 20, 2011, the whole content of each of these applications being incorporated herein by reference for all purposes.

TECHNICAL FIELD OF THE INVENTION

The invention relates to a process for producing sodium bicarbonate from a sodium carbonate bearing stream comprising sodium carbonate and at least one impurity consisting of an alkaline metal soluble salt while minimizing a final purge volume needed for producing the sodium bicarbonate, and also minimizing the loss of alkaline sodium associated with the purge.

BACKGROUND OF THE INVENTION

Sodium bicarbonate ($NaHCO_3$) is a mild alkaline compound with a wide range of applications including uses in human food, animal feed, flue gas treatment, and chemical industries. World production of sodium bicarbonate in 2008 is estimated at 2.8 million tons. Most of its production derives from natural and synthetic sodium carbonate ($Na_2CO_3$). The production of sodium bicarbonate is mainly made by the carbonation of a sodium carbonate aqueous solution with gaseous $CO_2$. The sodium carbonate aqueous solution may come from purified sodium carbonate dissolved in water, or a from a partially decarbonated slurry of crude sodium bicarbonate from the Solvay process, or from a sodium carbonate solution taken out from a sodium carbonate crystallizer fed with solutions deriving from trona or nahcolite ores.

When sodium bicarbonate is made from solid refined sodium carbonate, the content of sodium carbonate in impurities, such as alkaline metal water-soluble salts, is low enough so that those impurities may efficiently be extracted from the sodium bicarbonate process with the final produced sodium bicarbonate. Therefore no specific purge of such impurities is needed in the corresponding sodium bicarbonate process.

Yet when sodium bicarbonate is made from sodium carbonate streams from either synthetic soda ash (Solvay or derived Hou processes) or from natural soda ash (trona or nahcolite related processes) those sodium carbonate streams contain higher levels of soluble impurities and a purge is needed to control the level of impurities in the sodium bicarbonate process. This purge is generally high and fed back in the corresponding sodium carbonate process or sent to high volumes deposit ponds such as the processes described in U.S. Pat. No. 7,507,388 or in US2009/0291038 or in US2011/112298.

Aside sodium bicarbonate, sodium carbonate, also called soda ash, is a large volume alkali commodity with a total production in 2008 of 48 million tons world wide, which finds major use in the glass, chemicals, detergents industries, and also in the sodium bicarbonate production industry. The main processes for sodium carbonate production are the Solvay ammonia synthetic process, the ammonium chloride process (Hou process) derived from the Solvay process, and the trona-based processes.

Trona ore is a mineral that contains up to 99% sodium sesquicarbonate ($Na_2CO_3.NaHCO_3.2H_2O$). Trona-based soda ash is obtained from trona ore deposits in Green River (Wyo.), Turkey, China, and Kenya either by conventional underground mining techniques, by solution mining or lake waters processing. The trona-based sodium carbonate from Wyoming comprises about 90% of the total U.S. soda ash production.

A typical analysis of the trona ore in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |
| Organics | 0.3 |

Trona deposits contain diverse highly soluble impurities such as alkaline metal halides (sodium chloride, potassium chloride, sodium fluoride, . . . ), alkaline metal sulfates (sodium sulfate, potassium sulfate, . . . ), alkaline metal nitrate (sodium nitrate, potassium nitrate, . . . ), alkaline metal borate, alkaline metal phosphates, etc. . . . . Those highly soluble impurities are in various proportions depending on the geographic location of the deposits. In particular, sodium chloride and sodium sulfate may represent several percents or several tens percents of trona ore depending on the geographic location.

Trona deposits also include slightly soluble mineral or organic impurities. Examples of slightly soluble mineral are: alkali metal and alkali earth metal silicates, aluminates, titanates, vanadates, metallic compounds and salts. The organic impurities come from organic sediments that were captured during the formation of the deposits and that frequently have formed oil shales during geological aging. Both mineral and organic soluble impurities may also be partially generated during the trona processing in the mine or on surface operations. In particular thermal treatments, such as calcination, generally amplify the quantity of some soluble impurities such as sodium silicates, and sodium salts of organic compounds by thermal saponification.

Other "insoluble" or very slightly water-soluble mineral impurities found in trona or adjacent to trona deposits are generally mixtures of different minerals, the most frequent of which are calcite, dolomite, pirssonite, zeolite, feldspar, clay minerals, iron/aluminium silicates, and calcium sulfate.

Two main techniques well known in the art are used to recover trona ore from trona ore deposits. The first technique is a mechanical mining, also called conventional mining, such as a room and pillar panel operation or a longwall operation. The second technique is a solution mining recovering wherein trona is dissolved with water and recovered as a solution.

Among the several ways in which sodium carbonate can be recovered from trona ore that contains other salts and impurities, the most widely practiced is the so called "monohydrate process". In that process a mined trona ore is crushed, then calcined into crude sodium carbonate, then leached with water, the resulting water solution is purified and fed to a crystallizer where pure sodium carbonate monohydrate crystals are crystallized. The monohydrate crystals are separated from the mother liquor and then dried into anhydrous sodium carbonate. Most of the mother liquor is recycled into the crystallizer. However, the soluble impurities contained in the trona ore, tend to accumulate into the crystallizer. To avoid build up of impurities, the mother liquor must be purged. The purge liquor, which represents important quantities for industrial monohydrate plants, is commonly sent to an evaporative pond, also called tailings pond. The significant quantity of alkali which is contained in the purge liquor is consequently lost. Moreover, the stocking of large quantities of purge liquors in evaporative ponds raise environmental problems, because of the scarce availability of new areas for stocking.

Variants to produce sodium carbonate from trona ore, in particular when solution mining is used, is:
either crystallizing refined sodium sesquicarbonate (sesqui) after evaporation of water, then calcining the sodium sesqui into soda ash;
or alternatively decomposing thermally (with steam) or calcine chemically (with caustic soda) the dissolved sodium bicarbonate to transform it into dissolved sodium carbonate, then evaporating the water in order to crystallize pure sodium carbonate monohydrate.

In those variants, the soluble impurities contained in the trona ore, tend to accumulate also into the sesqui or the monohydrate crystallizers. To avoid the build up of impurities, the mother liquors must also be purged, raising the same environmental problems in evaporative ponds as the monohydrate process.

Several technical alternatives have been proposed to reduce the purge volume from soda ash plants.

US2003/0143149 discloses a process for recovering sodium-based chemicals from sodium carbonate streams such as purges and waste streams using a sodium carbonate decahydrate crystallizer, from which purified decahydrate is recovered and recycled to monohydrate crystallizer and a purge concentrated in impurity such as sodium sulfate is disposed off. Though the purge reduction factor of this process is limited because when high concentration of impurities is reached, sodium carbonate and sodium sulfate forms decahydrated mixed salts. And if high amounts of sodium sulfate are recycled back to carbonate monohydrate crystallizer, they generate burkeite crystals ($Na_2CO_3 \cdot 2Na_2SO_4$) that are detrimental to sodium carbonate monohydrate quality.

US2004/0057892 discloses a process for the production of sodium carbonate and bicarbonate, according to a purge liquor from a monohydrate sodium carbonate crystallizer is introduced into a sodium carbonate decahydrate crystallizer and the purified decahydrate crystals are converted into sodium bicarbonate. It has been observed that this process is not efficient when the purge liquor, depending on the trona source, contains high levels of impurities. High levels of sodium chloride in the purge liquor prevent smooth crystallization of sodium carbonate decahydrate.

U.S. Pat. No. 2,926,995 discloses a process for producing sodium bicarbonate crystals from sodium carbonate solutions containing sodium chloride from electrolytic caustic soda-chlorine cells.

U.S. Pat. No. 7,507,388 discloses a process for the production of sodium carbonate and bicarbonate, from a pre-purified solution comprising bicarbonate which is first partially decarbonized and then used in both a sodium bicarbonate line and a sodium carbonate monohydrate line. The purge stream of the sodium carbonate monohydrate crystallizer is either sent into a mixed sodium carbonate decahydrate and sodium sesquicarbonate line wherein resulting filtrate is discarded as the final purge of the process or sent after dilution into a light soda ash line comprising an intermediate sodium bicarbonate carbonation step, the bicarbonate is separated from the filtrate, and this filtrate is also disposed as a final purge. The taught total amounts of generated purges is very high (1.28 t of purges per ton of dense soda ash) and corresponds to 6 to 15 weight percents of purged sodium carbonate per ton of produced dense soda ash.

US2009/0291038 (Solvay) discloses a process for the joint production of sodium carbonate and sodium bicarbonate crystals, according to which a solid powder derived from sodium sesquicarbonate such as calcined trona is dissolved in water, the resulting water solution is introduced into a crystallizer, wherein sodium carbonate crystals and a mother liquor are produced, part of the mother liquor is taken out of the crystallizer (purge of the sodium carbonate crystallizer) and is carbonized (carbonated) to produce valuable sodium bicarbonate crystals and a second mother liquor, the second mother liquor is optionally decarbonized (debicarbonated) and then sent to a storage pond. In this document, it is taught that the mother liquor used for sodium bicarbonate crystallization should contain preferably at least 175 g/kg of sodium carbonate and not more than 60 g/kg of sodium chloride, and not more than 20 g/kg of sodium sulfate. Consequently the purge level of sodium alkali (carbonate or bicarbonate) sent to a pond is reduced compared to a decahydrate treatment of the purge but is still important and represents important volumes sent into ponds. Moreover the final purge rich in sodium bicarbonate forms in the evaporative ponds a solid that is harder and less easy to collect and recycle to soda ash plant as it comprises less sodium carbonate decahydrate crystals easy to melt and more hard sodium sesquicarbonate and bicarbonate crystals that do not melt.

US2011/112298 discloses a method for extending the life of tailings ponds produced from purge streams containing sodium carbonate wherein the purge stream is treated with gaseous carbon dioxide, similar to the US2009/0291038 process, to produce sodium bicarbonate or sodium sesquicarbonate before being introduced in the pond. The produced sodium bicarbonate may be recovered before the introduction of the treated purge stream into tailings pond or recovered after its deposition into the pond. The document is silent on further valorizing the obtained aqueous purge when sodium bicarbonate is recovered. Moreover as in the process described in US2009/0291038, the final purge rich in sodium bicarbonate forms in the evaporative ponds a solid that is harder and less easy to collect and recycle to soda ash plant as it comprises less sodium carbonate decahydrate crystals easy to melt and more hard sodium sesquicarbonate and bicarbonate crystals that do not melt.

Therefore there is still a need in the sodium bicarbonate and carbonate industry, taking into account sustainable development, to be able to further reduce the purge volume and reducing the loss of alkali in a simple way, without impairing operation conditions of the linked processes.

SUMMARY OF THE INVENTION

Accordingly, the invention concerns a process for producing sodium bicarbonate from a sodium carbonate bearing stream (A) comprising sodium carbonate and at least one impurity consisting of an alkaline metal water-soluble salt at a concentration $C_i(A)$, which comprises the following steps:
a) mixing the sodium carbonate bearing stream (A) with at least part of a stream (B) to produce a stream (C),
b) bicarbonating the stream (C) with a gas (D) comprising $CO_2$ to produce an aqueous suspension (E) comprising crystals (F) comprising sodium bicarbonate crystals, c) separating the aqueous suspension (E) in order to obtain crystals (F) comprising sodium bicarbonate crystals on the one hand and an aqueous mother liquor (G) on the other hand, d) partly debicarbonating at least part of the aqueous mother liquor (G) and removing part of the water of the at least part of the mother liquor (G) to obtain the stream (B) with an at least one impurity of water-soluble salt of alkaline metal at a concentration $C_f(B)$ and an optional gas (H), e) recycling at least a part of the stream (B) to step a) so that the ratio of the concentrations $C_f(B)/C_i(A)$ of the at least one impurity of water-soluble salt of alkaline metal is at least: 1.4, advantageously at least 2, more advantageously at least 4, and even more advantageously 7, and f) removing the remainder (I) of the stream (B) or the remainder (J) of the mother liquor (G) to be further processed.

A first advantage of the present invention is that it reduces considerably the amount of alkali loss in the purge of a sodium bicarbonate process or of a sodium carbonate process in a smooth and inexpensive way, thanks to the synergy of the carbonating step b) with the partly debicarbonating step d) and with the recycling step e), in particular with the presence of high amount of sodium chloride or sulfate.

A second advantage of the present invention is that it is efficient on a large spectrum of soluble impurities and a large range of impurities concentrations.

A third advantage of the process of the present invention linked to the second advantage is that it enables to use sodium carbonate streams from either synthetic sodium carbonate processes or from natural sodium carbonate processes.

A fourth advantage of the present invention is that the obtained technical sodium bicarbonate contains less water-soluble impurities that the sodium carbonate that would have been produced in equivalent conditions of water-soluble impurities concentration.

A fifth advantage of the present invention also linked to the second advantage is that it enables to exploit one or several trona deposits with different levels of soluble impurities while being able to treat the varying levels of the purges of a soda ash or a sodium bicarbonate plant with the same process described in present invention.

A sixth advantage of the present invention is that it enables to send a final purge (I) to tailings ponds that has a reduced content in sodium bicarbonate and easier to recover and to be melted as it forms more soft decahydrate crystals and less hard sodium sesquicarbonate crystals and so easier to be recycled in soda ash plant if needed.

A seventh advantage of the present invention is that it enables to minimize the purge flow preparing the process for either dry-cooking the purge or for very small evaporative ponds or for reinjecting the purge into mined out cavities.

A eighth advantage of the present invention is that it enables to remove a final purge, from a soda ash process or a sodium bicarbonate process, reduced in alkaline sodium content and rich in natural salts such as sodium chloride or sulfate that may come originally from the sea and that may be recycled back in the sea after dilution.

A ninth advantage of the present invention is that it decreases the size of equipment and the corresponding investment, and processing cost of a further process of the concentrated stream (I) (or stream (L) or stream (J)) aimed to remove and to valorize or to dispose of part of the concentrated impurities.

A tenth advantage of the present invention is that it enables to reduce water consumption for soda ash production and/or sodium bicarbonate production, in recovering it as condensates from evaporators for either recycle it to a calcined trona leaching or to a trona solution mining.

An eleventh advantage of the present invention is that it enables to increase the production of valuable technical sodium bicarbonate from sodium alkaline streams comprising impurities.

A twelfth advantage of the present invention is that the obtained technical sodium bicarbonate is well suited for specific uses such as flue gas mitigation despite high impurities concentration.

BRIEF DESCRIPTION OF THE DRAWINGS

The reference figures and letters quoted below refer to the attached drawings.

DEFINITIONS

For purposes of the present description, certain terms are intended to have the following meanings.

The term "purge" refers to a stream withdrawn from a part of a process to limit impurity concentration in this process.

The term "impurity" refers to a compound different from the sodium carbonate and/or the sodium bicarbonate to be produced.

The term "solubility" refers to the water solubility of a compound in an aqueous solution.

The term "carbonating" refers to the action of increasing the amount of total carbonate (carbonate and bicarbonate) of a stream.

The term "decarbonating" refers to the action of decreasing the amount of total carbonate (carbonate and bicarbonate) of a stream.

The term "bicarbonating" refers to the action of increasing the amount of bicarbonate of a stream.

The term "debicarbonating" refers to the action of decreasing the amount of bicarbonate of a stream.

DETAILED DESCRIPTION OF THE PREFERRED EMBODIMENTS

The present invention relates to a process for producing sodium bicarbonate from a sodium carbonate bearing stream (A) comprising sodium carbonate and at least one impurity consisting of an alkaline metal water-soluble salt at a concentration $C_i(A)$, which comprises the following steps:

a) mixing the sodium carbonate bearing stream (A) with at least part of a stream (B) to produce a stream (C), b) bicarbonating the stream (C) with a gas (D) comprising $CO_2$ to produce an aqueous suspension (E) comprising crystals (F) comprising sodium bicarbonate crystals, c) separating the aqueous suspension (E) in order to obtain crystals (F) comprising sodium bicarbonate crystals on the one hand and an aqueous mother liquor (G) on the other hand, d) partly debicarbonating at least part of the aqueous mother liquor (G) and removing part of the water of the at least part of the mother liquor (G) to obtain the stream (B) with an at least one impurity of water-soluble salt of alkaline metal at a concentration $C_f(B)$ and an optional gas (H), e) recycling at least a part of the stream (B) to step a) so that the ratio of the concentrations $C_f(B)/C_i(A)$ of the at least one impurity of water-soluble salt of alkaline metal is at least: 1.4, advantageously at least 2, more advantageously at least 4, and even more advantageously 7, and f) removing the remainder (I) of the stream (B) or the remainder (J) of the mother liquor (G) to be further processed.

In the present invention, the at least one impurity consisting of an alkaline metal soluble salt is generally an inorganic water-soluble salt selected from the group consisting of: sodium fluoride, sodium chloride, sodium bromide, sodium iodide, potassium chloride, sodium sulfite, sodium sulfate, potassium sulfate, sodium selenate, sodium nitrite, sodium nitrate, sodium hypochlorite, sodium chlorite, sodium phosphate, sodium aluminate, sodium borate, sodium silicate, sodium titanate, sodium vanadate, and combinations thereof. In particular the at least one impurity consisting of an alkaline metal soluble salt selected from the group consisting of: sodium fluoride, sodium chloride, sodium bromide, sodium iodide, potassium chloride, sodium sulfate, potassium sulfate, sodium nitrite, sodium phosphate, sodium vanadate, and combinations thereof are preferred. Indeed such impurities remain preferably in mother liquor (G) and their concentration is controlled by the process of present invention. Advantageously the alkaline metal water-soluble salt is a sodium or a potassium water-soluble salt, more advantageously a sodium water-soluble salt.

In one embodiment of the present invention the at least one impurity consisting of an alkaline metal water-soluble salt is sodium chloride (NaCl). In particular the process has proved efficient even with high concentrations of sodium chloride at several tens of grams of NaCl per kilogram of stream (B). Advantageously, the concentration Cf(B) of sodium chloride is advantageously at least 130 g/kg, more advantageously at least 150 g/kg, yet more advantageously at least 170 g/kg. The concentration Cf(B) of sodium chloride (NaCl) is generally at most 300 g/kg, preferably at most 260 g/kg, more preferably at most 220 g/kg, yet more preferably at most 180 g/kg, In another embodiment of the present invention the at least one impurity consisting of an alkaline metal water-soluble salt is sodium sulfate ($Na_2SO_4$). In that case the concentration Cf(B) of sodium sulfate is generally at least 20 g/kg, advantageously at least 40 g/kg, more advantageously at least 80 g/kg, preferably at least 120 g/kg. The concentration Cf(B) of sodium sulfate is generally at most 200 g/kg, preferably at most 180 g/kg, more preferably at most 160 g/kg.

The stream (A) may comprise also at least one other impurity selected from the group of partially water-soluble salts of: aluminium (Al), silver (Ag), arsenic (As), bismuth (Bi), cadmium (Cd), cobalt (Co), chromium (Cr), cupper (Cu), iron (Fe), mercury (Hg), molybdenum (Mo), manganese (Mn), nickel (Ni), lead (Pb), antimonium (Sb), tin (Sn), titanium (Ti), thallium (Tl), zinc (Zn), vanadium (V) and combinations thereof. Advantageously, the at least one other impurity is selected from the group of partially water-soluble salts of: arsenic (As), molybdenum (Mo) and combinations thereof. Indeed such impurities remain preferably in mother liquor (G) and their concentration is controlled by the process of present invention. The concentration in weight in stream (A) of the corresponding elements quoted above are generally in the range between 1 ppb (part per billion) to 1000 ppm (part per million) of the element reported to the weight of stream (A). And the concentrations are more often between 0.1 to 100 ppm. Such impurities of partially water-soluble salts of the above listed elements are generally: carbonate, or bicarbonate, or hydroxide, or chloride, or sulfate, or nitrate, or phosphate, or aluminate, or silicate salts of the corresponding elements.

When the at least one other impurity is selected from the group of partially water-soluble salts of: aluminium (Al), boron (B), cobalt (Co), iron (Fe), manganese (Mn), zinc (Zn) and combinations thereof, such impurities are captured mainly by the crystals (F) comprising sodium bicarbonate crystals. The levels of concentrations of such impurities are generally less than 200 ppm in stream A. Therefore the present invention relates also on a process wherein such impurities are removed from stream (A) at step b) along with crystals (F) that are separated at step c) from the aqueous mother liquor (G).

Also, the process of the present claimed invention has also shown to be efficient with alkaline metal soluble salt of organic compounds, in particular with alkaline metal soluble salt of kerogeneous organics (the organics in oil shales are called kerogen). When kerogeneous organic comprises mono, or di, or multi-carboxilic acids, the solubility of such organic increases and may be from a few tens of ppm in weight up to several thousands of ppm. Therefore in one embodiment of the present process the at least one impurity consisting of an alkaline metal soluble salt is an organic alkaline metal soluble salt. Alcohol, ketones, and aldehyde groups are also favorable to a higher solubility of the corresponding organics in a sodium carbonate aqueous stream.

The sodium carbonate bearing stream (A) may be any stream made of a solid, a suspension of a solid in an aqueous solution, or an aqueous solution, comprising sodium carbonate, and suitable for feeding a sodium bicarbonate crystallizer.

In a first variant of the present process, the sodium carbonate bearing stream (A) derives partly or totally from crude sodium bicarbonate from a synthetic soda ash process, such as the Solvay ammonia synthetic process or the Hou ammonium chloride process. Advantageously, the sodium carbonate bearing stream (A) is an aqueous solution that derives partly or totally from a partially decarbonated slurry of crude sodium bicarbonate from the Solvay ammonia synthetic process or the Hou ammonium chloride process.

In a second variant of the present process, the sodium carbonate bearing stream (A) derives partly or totally from trona or nahcolite. Preferably the sodium carbonate bearing stream (A) derives partly or totally from trona. In the present invention the trona is generally processed by conventional mining. Advantageously the trona may be also processed by solution mining. Indeed when trona is processed by solution mining, alkaline metal water-soluble salts may be increased because of percolating waters to adjacent ore layers that may contain water-soluble minerals. Generally such water-soluble minerals comprise, in particular, alkaline metal halides (fluorides, chlorides, bromides, iodides), sulfates, borates, phosphates, aluminates, silicates, titanates, vanadates water-soluble salts. This renders the present invention particularly adapted to production of technical sodium bicarbonate from trona processed by solution mining.

The sodium carbonate bearing stream (A) may also derives partly or totally from tailings pond solids comprising sodium carbonate. This may be of particular advantage if the considered tailings pond solids are rich in silicates and organics, as the sodium bicarbonate crystals formed at step b) will catch most of the silica and part of the organics present in the stream (C), and this improves the flowability of crystals (F).

In an advantageous embodiment of the first or of the second variant of the present process the sodium carbonate bearing stream (A) is an aqueous solution (A') comprising sodium carbonate.

In a particular embodiment of the first or the second variant of the present process, the stream (A) is taken out from a sodium carbonate crystallizer. In the present invention, the sodium carbonate crystallizer means a crystallizer wherein crystals comprising sodium carbonate are generated. The sodium carbonate crystallizer is selected from the group consisting of: an anhydrous sodium carbonate crystallizer, a monohydrate sodium carbonate crystallizer, a heptahydrate sodium carbonate crystallizer, a decahydrate sodium carbonate crystallizer, a sodium sesquicarbonate crystallizer, a wegscheiderite ($Na_2CO_3.3NaHCO_3$ also called decemite) crystallizer, and combination thereof. Advantageously the stream (A) is an aqueous solution (A') taken out from a sodium carbonate crystallizer. More advantageously the aqueous solution (A') is a purge from a sodium carbonate monohydrate crystallizer.

Therefore the present invention relates also to a process for the joint production of sodium carbonate and bicarbonate crystals comprising in a first step introducing a sodium carbonate solution comprising sodium carbonate and at least one impurity consisting of an alkaline metal water-soluble salt into a sodium carbonate crystallizer, producing a first aqueous suspension comprising sodium carbonate crystals, subjecting the first aqueous suspension to a separation, in order to obtain crystals comprising sodium carbonate on the one hand, which are valorized, and a mother liquor on the other hand, part of the mother liquor is taken out of the sodium carbonate crystallizer to constitute the sodium carbonate bearing stream (A) to be further processed according the process for producing sodium bicarbonate of the present process.

In the above particular embodiment of the present invention, the sodium carbonate crystallizer is advantageously fed with a sodium carbonate solution comprising sodium carbonate and at least one impurity consisting of an alkaline metal water-soluble salt at a concentration $C_0$, and the ratio of the concentrations $C_f(B)/C_0$ of the at least one impurity is at least 14, advantageously at least 30, more advantageously at least 60, and even more advantageously at least 120.

In the present invention the sodium carbonate crystallizer may also be a container or an evaporative pond wherein crystals comprising sodium carbonate compounds are formed.

In a special embodiment of the second variant of the present process, the aqueous solution (A') is a purge from a sodium carbonate monohydrate crystallizer in combination with tailings pond solids deriving from sodium carbonate crystallizers purges.

In another special embodiment of the second variant of the present process, the process of the present invention is coupled with the process described in WO2011/138005A1 (Solvay), which is incorporated herewith by reference. In this case the process of the present invention further comprises:

k) depositing the remainder (I) of the stream (B) in a tailings pond and wherein part of the remaining sodium carbonate in the tailings pond crystallizes into a solid mass comprising sodium carbonate decahydrate and wherein a concentrated solution (Q) is formed comprising impurities selected from the group consisting of silicates, sodium chloride, sodium sulfate, organic matter, and combinations of two or more thereof, l) optionally contacting said solid mass with a leach solution to selectively dissolve at least a portion of a first impurity from the contacted mass into the leach solution to form a leachate and a leached residue, collecting the leached residue, dissolving at least a portion of the leached residue in an aqueous medium to form a liquor; optionally carrying out a second impurity removal step comprising performing a magnesium treatment to form a treated liquor, said treatment comprising adding a magnesium compound during dissolution of the leached residue or adding a magnesium compound to said liquor or a portion thereof after dissolution of the leached residue in order to form water-insoluble matter with at least a portion of a second impurity, and passing said treated liquor though at least one separation unit to remove water-insoluble matter and to obtain a purified solution;

m) providing said solid mass or said liquor or said purified solution as a feedstock to a process which produces a crystalline product comprising sodium carbonate, sodium bicarbonate, sodium sulfite, or other derivatives.

The remainder (I) of the stream (B) or part (L) (as defined in the embodiment of FIG. 2), or part (J) of the mother liquor (G) are concentrated in soluble salts and other impurities present in the sodium carbonate bearing stream (A). Therefore in another variant of the present invention, the process further comprises the following steps:

n) disposing of the remainder (I) of the stream (B) or part (J) of the mother liquor (G) or part (L) of the liquor (K) in a solution mining cavity or a mined out cavity or in a deep well injection or, o) recycling the remainder (I) of the stream (B) or part (J) of the mother liquor (G) or part (L) of the liquor (K) in a solution mining cavity or a mined out cavity, and recovering a sodium carbonate aqueous solution from the solution mining cavity or from the mined out cavity wherein the recovered sodium carbonate aqueous solution comprises sodium chloride and/or sodium sulfate at a sodium chloride and/or sodium sulfate concentration less than the concentration of sodium chloride and/or the concentration of sodium sulfate in the remainder (I) or the part (J) or the part (L).

Steps n) or o) are particularly advantageous when the sodium carbonate bearing stream (A) derives partly or totally from trona or nahcolite, as it enables to recycle the soluble salts that were originally present in the ore within the mine cavity, the mine or the deep well. Moreover the pH of the final purges may be controlled according the sodium bicarbonate content, as sodium bicarbonate is a natural pH buffer. Thus the volume that is recycled in such cavity or mine, or deep well, is much reduced compared to the volume of the original ore extracted from the cavity or from the mine, or from the deep well.

Generally the sodium carbonate bearing stream (A) comprises at least 15 weight percent of sodium carbonate expressed on dry soluble salts. Advantageously stream (A) comprises at least: 20, more advantageously 24 weight percent of sodium carbonate expressed on dry soluble salts.

The stream (A) is advantageously selected among the group of recycle and purge streams from sodium carbonate or sesquicarbonate crystallizers, mine water streams, evaporative pond bittern aqueous streams, water and sodium carbonate decahydrate deposits, other waste streams, and combination thereof. Stream (A) comprises generally at most: 98, advantageously at most 95, more advantageously at most 85 weight percent of sodium carbonate expressed on dry soluble salts. When the sodium carbonate bearing stream (A) is a suspension of a solid in an aqueous solution, or an aqueous solution, it comprises generally at most: 99, advantageously at most 90, more advantageously at most 80 weight percent of water. This enables to limit the number of recycling in the sodium bicarbonate loop of the present invention.

If the sodium carbonate stream derives from a solid stream, or is an aqueous suspension, or an aqueous solution concentrated in sodium carbonate, water (N) may be added to the sodium carbonate bearing stream (A) so that the combination of the stream (B) with stream (A) forms a feeding stream (C) suitable to form crystals (F) comprising sodium bicarbonate crystals when bicarbonated. In particular, the amount of water (N) is controlled in order to limit the density of suspension of crystals (F) in the aqueous suspension (E) to be generally at most 60 w %, advantageously at most 50 w %, preferably at most 40 w %, more preferably at most 35 w %. The density of suspension of solids in an aqueous suspension being the weight ratio of the solid reported to the aqueous suspension.

In the present invention the stream (A) comprises generally at least 2%, advantageously at least 3%, more advantageously at least 4% sodium chloride and/or sodium sulfate by weight.

The stream (A) may contain high level of sodium chloride and/or sodium sulfate. Though advantageously the concentration of stream (A) in sodium chloride and/or sodium sulfate should be limited to a maximum value so that the stream (G), corresponding to the mother liquor of the bicarbonate crystallizer separated at step c), has a concentration of at most 26% (260 g/kg) in sodium chloride or at most 20% (200 g/kg) in sodium sulfate by weight in order to avoid the limit of solubility of sodium chloride and/or sodium sulfate in stream (G).

In the case that stream (A) comprises both sodium chloride and sodium sulfate, those two impurities concentration in stream (G), noted respectively [NaCl](G) and [Na$_2$SO$_4$](G) and expressed in g/kg, should be advantageously limited according the following equation;

[NaCl](G)/1.3+[Na$_2$SO$_4$](G)≤200 g/kg

Also when significant concentration of other highly soluble salts with common ion with sodium, or chloride, or sulfate ions, in a proportion when cumulated of at least 5% in weight of the cumulated sodium chloride and sodium sulfate amount of stream (A), those impurities salt concentrations should be added to the sum of the concentrations of sodium chloride and sodium sulfate, and this later sum should be maintained at most at 20% by weight in stream (G).

In the present invention, the streams (I) or (J) (or (L)) are used to control the alkaline metal water-soluble salt concentration, such as sodium chloride, or sodium sulfate concentrations, in the aqueous mother liquor (G) during bicarbonation step b). When the flow of streams (I) or (J) (or (L)) increase, the concentration of the alkaline metal water-soluble salt(s) concentration(s) $C_i$(G) in the process loop decreases, and vice versa. Those flows may be adjusted so that at the targeted set concentration of the alkaline metal water-soluble salt in the aqueous mother liquor (G), or in the streams (I) or (J) (or (L)), the flow of purged alkaline metal water-soluble salt in the corresponding streams (I) or (J) (or (L)) equal the entering flow of the alkaline metal water-soluble salt entering in the process (i.e., via streams (A), (A'), (A'') and (A''')) minus the flow of the alkaline metal water-soluble salt exiting the process with the crystals (F).

Generally when the stream (A) is the aqueous purge of a monohydrate crystallizer, the NaCl concentration of the purge is at most 5% and the Na$_2$SO$_4$ concentration of the purge is at most 7% expressed on the aqueous solution in weight. Indeed a classical MVR (Mechanical Vapor Recompression) crystallizer cannot operate at NaCl levels significantly higher than 2-3% without crystallizing anhydrous sodium carbonate, which causes operational difficulties. Triple effects monohydrate evaporator crystallizer is operated at lower temperatures and can accept higher concentrations of NaCl, up to 4-5% depending on a number of factors. A Na$_2$SO$_4$ concentration above 3 to 7% induces burkeite crystals (Na$_2$CO$_3$.2Na$_2$SO$_4$) formation according the crystallizer temperature (between 40° to 100° C.).

Typical natural soda ash plant from trona have a Na$_2$CO$_3$ feed concentration in the liquor of from 28 to 30%, NaCl feed concentration of about 0.2%, and/or Na$_2$SO$_4$ feed concentration of from about 0.05 to 0.2%, meaning that a traditional plant in the prior art comprising a sodium carbonate crystallizer can operate between 10 and 20 cycles of concentration. This number of cycle of concentrations is generally close to the ratio of: the final concentration to the feeding concentration of the soluble impurity. This is what ultimately imposes product loss, purge volumes, and the size of ponds and disposals in a natural soda ash plant without recovery of the valuable alkali. The present invention enables to increase sensitively the cycle of concentrations from 10 to 20 cycles up to 75 cycles, and even more in a simple way. Moreover the present process enables to limit the energy consumption and related costs reported to the total sodium carbonate production, when the sodium carbonate stream (A) is a purge of a sodium carbonate crystallizer, as the purge represents generally from 2 to 15% of the sodium carbonate flow entering the sodium carbonate crystallizer.

In present invention, the partly debicarbonating of the aqueous mother liquor (G) and the removing of part of the water at step d) may be done by any mean known in the art. The partly debicarbonating and removing of part of the water may be done in one step or in several steps. Generally the debicarbonating is done by chemical calcination using caustic soda to transform part of the sodium bicarbonate of liquor (G) into sodium carbonate, or done by thermal debicarbonation using steam or using a boiler to decompose thermally part of sodium bicarbonate into sodium carbonate, water and CO$_2$. Thermal debicarbonation using steam or a boiler is preferred. The removing of part of the water of liquor (G) may be done in a falling film evaporator, or in a boiler, or in a forced circulation evaporator, or in a forced circulation evaporator crystallizer known in the art.

Figure 1:
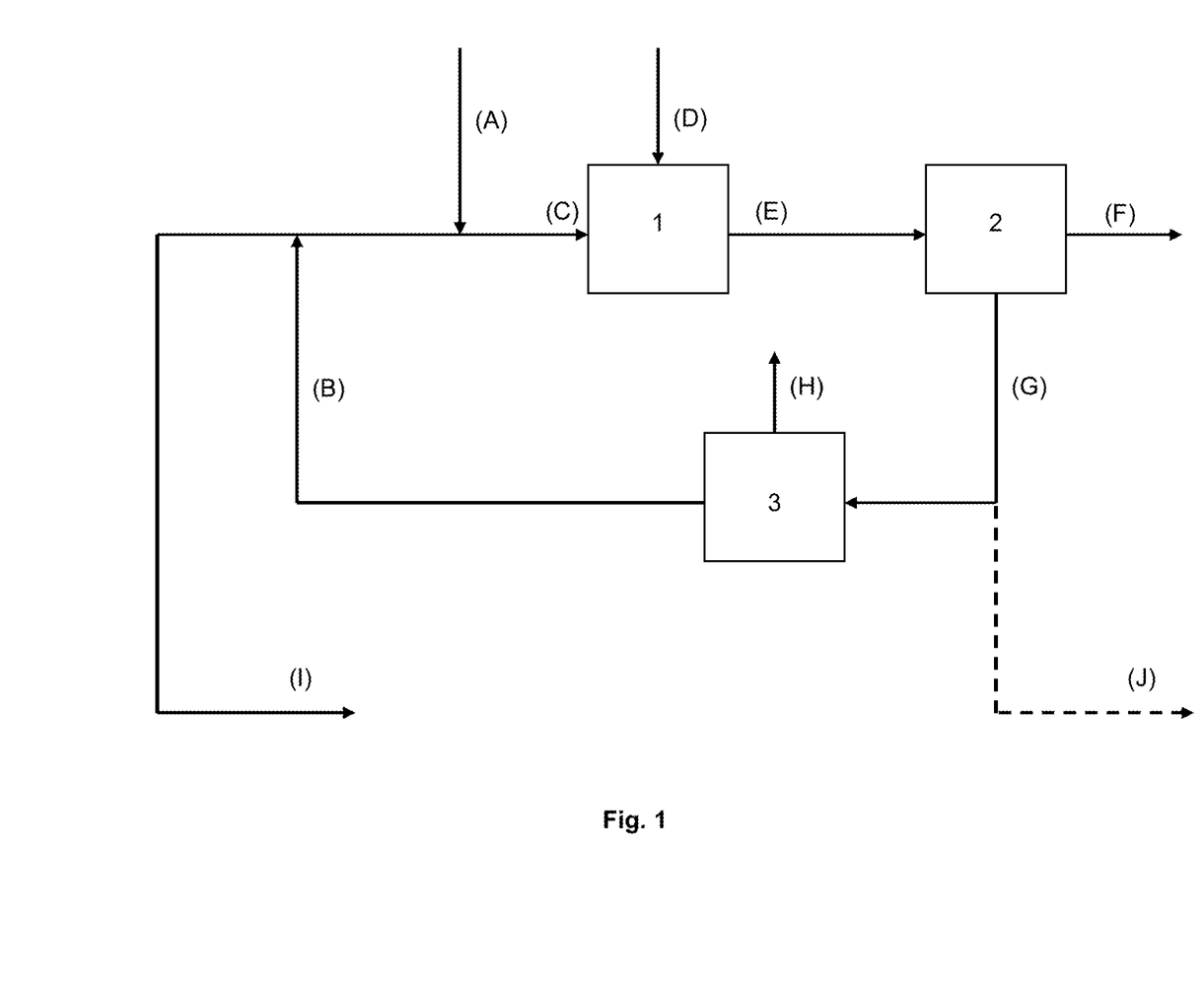
FIG. 1: is a flow diagram which schematically illustrates the process of the present invention.

The process according to an embodiment of the invention is illustrated in FIG. 1 (FIG. 1). The sodium carbonate bearing stream (A) is mixed with part of a stream (B) to produce a stream (C). The stream (C) is bicarbonated with a gas (D) comprising CO$_2$ in a carbonating device 1 to produce an aqueous suspension (E) comprising crystals (F), said crystals (F) comprising sodium bicarbonate crystals. The suspension (E) is separated into crystals (F) comprising sodium bicarbonate crystals on the one hand and an aqueous mother liquor (G) on the other hand with a separation device 2. The aqueous mother liquor (G) is partly debicarbonated and part of the water is removed to obtain the stream (B) and an optional gas (H) comprising CO$_2$ in a debicarbonator 3. Therefore the stream (B) is more concentrated in water-soluble salt content than the stream (G). At least part of stream (B) is recycled to form stream (C) in combination with stream (A). The remainder (I) of the stream (B) is removed from the loop or a part (J) of the aqueous mother liquor (G) is removed to be further processed.

Figure 2:
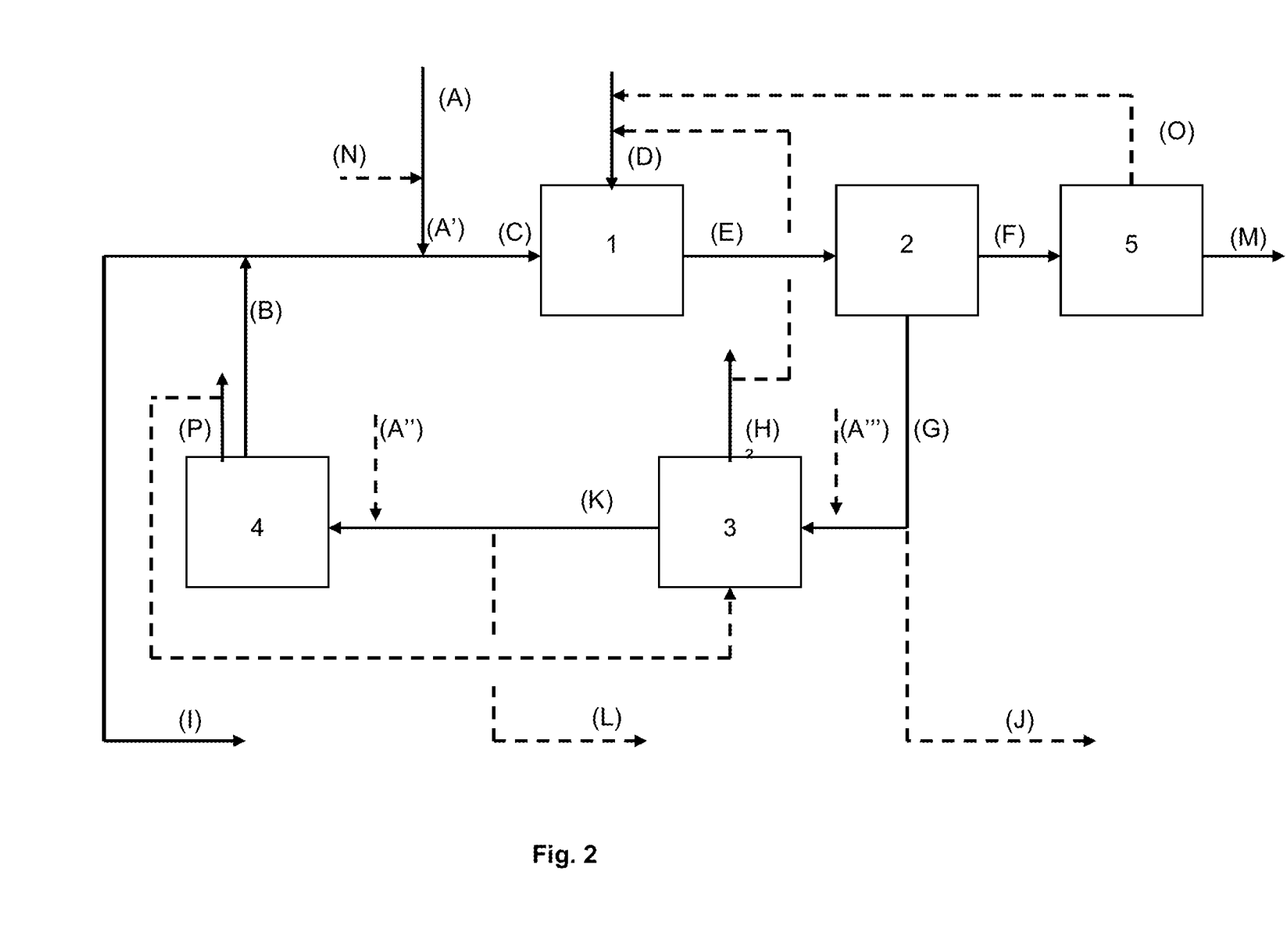
FIG. 2: is a flow diagram of a process according to an embodiment of the present invention.

FIG. 2 is a flow diagram of a process according to an embodiment of the present invention. In this embodiment the debicarbonation and the removal of part of the water of stream (G) is done into two steps and optional water and CO$_2$ gas (H) recyclings are described in dot lines. In this embodiment, the sodium carbonate bearing stream (A) is mixed with optional water (N) to form an aqueous solution (A') comprising sodium carbonate, and with a stream (B) to produce a stream (C). The stream (C) is bicarbonated with a gas (D) comprising CO$_2$ in a carbonating device 1 to produce an aqueous suspension (E) comprising crystals (F), said crystals (F) comprising sodium bicarbonate crystals. The suspension (E) is separated into crystals (F) comprising sodium bicarbonate crystals on the one hand and an aqueous mother liquor (G) on the other hand with a separation device 2. The aqueous mother liquor (G) is debicarbonated in a debicarbonator 3 to produce a mother liquor (K) depleted or lean in sodium bicarbonate and a vapor (H) comprising carbon dioxide, and the mother liquor (K) is partially evaporated to remove at least part of the water in an evaporator 4 to obtain the stream (B) and the water steam (P). The stream (B) may be a clear liquid or a slurry. Optionally part or the whole water steam (P) may be recycle to the debicarbonator and injected directly or after recompression of steam or may be recycled to the debicarbonator as indirect heating by a boiler. At least part of the concentrated stream (B) is recycled to form stream (C) in combination with stream (A). The remainder (I) of the stream (B) is removed, and/or a part (J) of the aqueous mother liquor (G) is removed from the loop, and/or part of the mother liquor (K) is removed from the loop to be further processed. Those streams (I), (J), (L) are indeed useful to control the at least one impurity consisting of an alkaline metal water-soluble salt concentration(s) in the aqueous mother liquor during bicarbonation step b) in the bicarbonator 1.

In a variant of this embodiment a sodium carbonate bearing stream (A"), such as mine waters, or tailings pond waters, or diluted waters, may be added to the mother liquor (K) depleted or lean in sodium bicarbonate before partially evaporating it to remove part of the water to obtain the concentrated stream (B). This may be advantageous to avoid the limit of solubility of sodium carbonate and/or the alkaline metal water-soluble salt in the evaporator.

In another variant of this embodiment if a sodium carbonate bearing stream (A''') such as mine waters, tailings pond waters, or diluted waters, have a sodium bicarbonate content, or a water content and a sodium bicarbonate content, to be decreased first before to be recycled in the bicarbonator, an adequate point to introduce this stream in the process is in the debicarbonator 3 with the aqueous mother liquor G.

Optionally if the embodiment illustrated in FIG. 2, the gas (H) is partly used for bicarbonating the stream (C) with the gas (D).

Indeed the gas (H) comprises a high content of $CO_2$ and the rest is mainly steam (water vapor) that may be reused at step b) without water condensation or with water condensation and water removal before introducing it in stream (D) to control the water balance of the present process along with the water removals from stream (F), (I), (L), (J), (P), and the total water inputs from streams (A), (A'), (A"), (A''').

In the present process, at step b), the gas (D) is a gas comprising at least: 20, advantageously at least 30, more advantageously at least 40, even more advantageously at least 80 volume % $CO_2$ expressed on dry gas.

The bicarbonation step b) is operated at any temperature compatible with known domain of sodium bicarbonate. Preferably it is operated at a temperature of at least: 20° C., advantageously at least 38° C., more advantageously at least 55° C., and even more advantageously at least 70° C.

A too high temperature may be detrimental to $CO_2$ absorption when not operated at pressure above atmospheric pressure. Therefore the bicarbonation step b) is generally operated at a temperature of at most: 100° C., advantageously at most 90° C., more advantageously at most 80° C., and even more advantageously at most 75° C.

In the present invention, the crystals (F) obtained at step b) comprise sodium bicarbonate crystals. Advantageously the operating point (mother liquor concentrations of sodium bicarbonate, of sodium carbonate, and of the alkaline metal water-soluble salt(s), such as NaCl and $Na_2SO_4$) in the carbonation step should be controlled so that it remains in the sodium bicarbonate domain of the solubility diagram. This is achieved supplying enough $CO_2$ in the bicarbonator so that the sodium carbonate concentration in the bicarbonator mother liquor (G) is less than the limit of sodium carbonate concentration at the sodium sesquicarbonate solubility noted $[Na_2CO_3]$(sesqui) at the operating temperature.

If $[X](G)$ represents the soluble salt concentrations expressed in g/kg of NaCl, or of $Na_2SO_4$, or the sum of NaCl and $Na_2SO_4$ concentrations if both salts are present, this is generally achieved between 20° to 80° C., when the sodium carbonate concentration of mother liquor (G), noted $[Na_2CO_3](G)$, is less than the following value (expressed in g/kg):

$$170-0.66[X](G) \text{ (g/kg)}$$

A security margin should be taken so that the sodium carbonate concentration is preferably at most this value minus 5 g/kg, more preferably at most this value minus 10 g/kg, and most preferred at most this value minus 20 g/kg.

This enables to crystallize mainly sodium bicarbonate. Then if the corresponding crystals are separated from their mother liquor (G) that is concentrated in NaCl and/or $Na_2SO_4$, and if optionally the obtained crystals are washed when necessary to remove high levels of impregnating mother liquor and soluble salts such as NaCl or $Na_2SO_4$, the content of crystals (F) comprising sodium bicarbonate crystals is generally at least 40 w %, or at least 50 w %, preferably at least 60 w %, more preferred at least 80 w %, and most preferred at least 90 w % of sodium bicarbonate. The crystals (F) comprises generally at most 50 w %, or at most 30 w %, or at most 20 w %, preferably at most 10 w %, more preferably at most 5 w %, and most preferably at most 3 w % of sodium carbonate.

The content of the crystals (F) in soluble salts such as sodium chloride and/or sodium sulfate is generally at most 10 w. %, preferably at most 4 w. %, more preferably at most 1 w. %.

According the final use of the obtained crystals (F) comprising sodium bicarbonate crystals, the process of the present invention may further comprise:

g) optionally washing the crystals (F) comprising sodium bicarbonate to produce optionally-washed crystals comprising sodium bicarbonate; and h) drying the optionally-washed crystals comprising sodium bicarbonate.

As an alternative there is the possibility to calcine partly or totally the sodium bicarbonate rather than just drying the crystals.

In that case the process according the present invention further comprises the steps of:

g) optionally washing the sodium bicarbonate crystals to produce optionally-washed crystals comprising sodium bicarbonate; and i) calcining crystals (F) comprising sodium bicarbonate crystals or the optionally-washed crystals comprising sodium bicarbonate into crystals comprising sodium carbonate.

When calcining partly or totally the sodium bicarbonate of the crystals at step i), a gas (O) comprising carbon dioxide is generated. The carbon dioxide and the water can be totally or partly recovered and recycled to the bicarbonation step.

Therefore the process of present invention may further comprise the step:

j) recovering at least part of the gas (O) comprising carbon dioxide and recycling it to step b).

EXAMPLES

The following examples are intended only to exemplify the invention and are not intended to limit the scope of the claimed invention.

Example 1

TABLE 2 exemplifies a mass flowsheet of an embodiment of the process of present invention as described in FIG. 2, wherein the main soluble salt impurity of the sodium carbonate stream (A) is sodium chloride.

This example shows the strong interest in the case where the sodium carbonate stream (A) is a purge from a sodium carbonate crystallizer: the mass flow of the final purge (I) is 226 kg/h, value representing less than a quarter of the value of the original purge (A) at 1000 kg/h, and the loss of sodium carbonate from final purge (I) is 27 kg/h so a reduction of a factor of almost 9 in mass compared to the initial value of 242 kg/h of sodium carbonate in initial purge (A), thanks to the recycling loop associated with a debicarbonator and an evaporator of the present process.

By comparison US2009/0291038 (Solvay) from prior art, shows at example 1 of the corresponding document a decrease of sodium alkali loss in the final purge of 60%, compared to about 90% in present example, and a reduction of 10% of the mass flow of the initial purge compared to about 77% in present example.

Example 2

In this example, the same data of TABLE 2 can illustrate a mass flow sheet of an embodiment of the process of present invention as described in FIG. 2, wherein the main soluble salt impurity of the sodium carbonate stream (A) is sodium sulfate ($Na_2SO_4$). In this case, sodium chloride (NaCl) mass flows and sodium chloride (NaCl) concentrations should be respectively interpreted as $Na_2SO_4$ mass flows and $Na_2SO_4$ concentrations rather than NaCl ones.

Example 3 to 7 (E0 to E6)

In this example similar equipments and operating conditions of Example 1 of US2009/0291038 (Solvay) were used but the bicarbonation was operated in batch, in an agitated 3-liter reactor, at 70° C., with $CO_2$ gas at 100% vol. dry concentration and saturated with water, with one hour of residence time.

The obtained crystals were filtered, washed with water and ethanol, dried for 24 hours at ambient temperature.

TABLE 3 gives the results of the analysis of initial and final mother liquors, of the obtained crystals, the density of suspension (solid weight reported to the suspension weight), and also of particles size distribution of the obtained crystals.

Should the disclosure of any patent, patent applications, and publications that are incorporated herein by reference conflict with the present description to the extent that it might render a term unclear, the present description shall take precedence.

TABLE 2

| | Example 1 - Mass Balance flowsheet. | | | | | | | | | | | |
| --- | --- | --- | --- | --- | --- | --- | --- | --- | --- | --- | --- | --- |
| Stream | (A) | (A") | (B) | (C) | (D) | (E) | (F) | (G) | (H) | (I) | (K) | (O) If calcined |
| Phase | liquid | liquid | liquid | liquid | gas | slurry | solid | liquid | gas | liquid | liquid | gas |
| Flow rate (kg/h) | 1000 | 500 | 1477 | 1751 | 94 | 1845 | 345 | 1500 | 28 | 226 | 1472 | 127 |
| Liquid | | | | | | | | | | | | |
| $NaHCO_3$ | 13 | 7 | 56 | 54 | | 68 | | 68 | | 9 | 50 | |
| $Na_2CO_3$ | 242 | 121 | 176 | 270 | | 44 | | 44 | | 27 | 55 | |
| NaCl | 39 | 20 | 255 | 236 | | 236 | | 236 | | 39 | 236 | |
| $H_2O$ | 706 | 353 | 990 | 1192 | | 1154 | | 1154 | | 151 | 1132 | |
| Total Liquid | 1000 | 500 | 1477 | 1751 | | 1500 | | 1500 | | 226 | 1472 | |
| Mass fraction (g/kg) | | | | | | | | | | | | |
| $NaHCO_3$ | 13 | 13 | 38 | 31 | | 45 | | 45 | | 38 | | |
| $Na_2CO_3$ | 242 | 242 | 119 | 154 | | 29 | | 29 | | 119 | | |
| NaCl | 39 | 39 | 173 | 134 | | 157 | | 157 | | 173 | | |
| $H_2O$ | 706 | 706 | 670 | 681 | | 769 | | 769 | | 670 | | |
| Solid | | | | | | | | | | | | |
| Flow rate (kg/h) | | | | | | | | | | | | |
| $NaHCO_3$ | | | | | | 345 | 345 | | | | | |
| $Na_2CO_3$ | | | | | | 0 | 0 | | | | | |
| Total Solid | | | | | | 345 | 345 | | | | | |
| Gas | | | | | | | | | | | | |
| Flow (kg/h) | | | | | | | | | | | | |
| $H_2O$ | | | | | | 0 | | | 23 | | | 37 |
| $CO_2$ | | | | | 94 | | | | 5 | | | 90 |
| Total Gas | | | | | 94 | | | | 28 | | | 127 |

TABLE 3

Operating conditions, and chemical and physical analysis of the obtained crystals of Examples 3 to 7 (respectively referenced E0, E2, E3, E6).

| Ref. Trial | # | E0 | E2 | E3 | E6 |
|---|---|---|---|---|---|
| Temperature | °C. | 70 | 70 | 70 | 70 |
| Residence time | h | 1 | 1 | 1 | 1 |
| Initial mother liquor | | | | | |
| $NaHCO_3$ | g/kg | 79 | 54 | 44 | 45 |
| $Na_2CO_3$ | g/kg | 49 | 52 | 52 | 50 |
| NaCl | g/kg | 136 | 144 | 153 | 75 |
| $Na_2SO_4$ | g/kg | — | — | — | 75 |
| $H_2O$ | g/kg | 736 | 750 | 751 | 755 |
| Total | g/kg | 1000 | 1000 | 1000 | 1000 |
| Final mother liquor | | | | | |
| $NaHCO_3$ | g/kg | 50 | 48 | 45 | 62 |
| $Na_2CO_3$ | g/kg | 11 | 20 | 10 | 17 |
| NaCl | g/kg | 146 | 153 | 165 | 78 |
| $Na_2SO_4$ | g/kg | — | — | — | 77 |
| $H_2O$ | g/kg | 793 | 779 | 780 | 766 |
| Total | g/kg | 1000 | 1000 | 1000 | 1000 |
| Final dried solid | | | | | |
| $NaHCO_3$ | g/kg | 942 | 915 | 908 | 906 |
| $Na_2CO_3$ | g/kg | 29 | 38 | 41 | 38 |
| NaCl | g/kg | 9 | 30 | 42 | 8 |
| $Na_2SO_4$ | g/kg | — | — | — | 8 |
| $H_2O$ | g/kg | 20 | 17 | 9 | 40 |
| Suspension density | w % | 6.9 | 6.3 | 6.5 | 4.7 |
| Particle size distri. | | | | | |
| d10 | μm | 121 | 41 | 39 | 50 |
| d50 | μm | 376 | 129 | 125 | 126 |
| d90 | μm | 678 | 280 | 415 | 566 |

The invention claimed is:

1. A process for producing sodium bicarbonate from a sodium carbonate bearing stream (A) comprising sodium carbonate and at least one impurity consisting of an alkaline metal water-soluble salt at a concentration $C_i(A)$, said process comprising the following steps:
   a) mixing the sodium carbonate bearing stream (A) with at least part of a stream (B) to produce a stream (C);
   b) bicarbonating the stream (C) with a gas (D) comprising $CO_2$ to produce an aqueous suspension (E) comprising crystals (F), said crystals (F) comprising sodium bicarbonate crystals;
   c) separating the aqueous suspension (E) in order to obtain crystals (F) comprising sodium bicarbonate crystals and an aqueous mother liquor (G);
   d) partly debicarbonating at least part of the aqueous mother liquor (G) and removing part of the water of the at least part of the mother liquor (G) to obtain the stream (B) with an at least one impurity of water-soluble salt of alkaline metal at a concentration $C_f(B)$ and an optional gas (H);
   e) recycling at least a part of the stream (B) to step a) so that the ratio $C_f(B)/C_i(A)$ of the at least one impurity of water-soluble salt of alkaline metal is at least 1.4; and
   f) removing a remainder (I) of the stream (B) which is not recycled to step a) or a part (J) of the mother liquor (G) which is not partly debicarbonated in step d) to be further processed.

2. The process of claim 1, wherein the at least one impurity consisting of an alkaline metal water-soluble salt is an inorganic water-soluble salt selected from the group consisting of: sodium fluoride, sodium chloride, sodium bromide, sodium iodide, potassium chloride, sodium sulfite, sodium sulfate, potassium sulfate, sodium selenate, sodium nitrite, sodium nitrate, sodium hypochlorite, sodium chlorite, sodium phosphate, sodium aluminate, sodium borate, sodium silicate, sodium titanate, sodium vanadate, and combinations thereof.

3. The process of claim 1, wherein the alkaline metal water-soluble salt is a sodium water-soluble salt or a potassium water-soluble salt.

4. The process according to claim 1, wherein the stream (A) further comprises at least one other impurity selected from the group consisting of partially water-soluble salts of aluminium (Al), silver (Ag), arsenic (As), bismuth (Bi), cadmium (Cd), cobalt (Co), chromium (Cr), cupper (Cu), iron (Fe), mercury (Hg), molybdenum (Mo), manganese (Mn), nickel (Ni), lead (Pb), antimonium (Sb), tin (Sn), titanium (Ti), thallium (Tl), zinc (Zn), vanadium (V), and combinations thereof.

5. The process according to claim 1, wherein one of the at least one impurity consisting of an alkaline metal water-soluble salt is an organic alkaline metal water-soluble salt.

6. The process according to claim 1, wherein one of the at least one impurity consisting of an alkaline metal water-soluble salt is sodium chloride (NaCl).

7. The process of claim 6, wherein the concentration $C_f(B)$ of sodium chloride (NaCl) is at least 130 g/kg.

8. The process according to claim 1, wherein one of the at least one impurity consisting of an alkaline metal water-soluble salt is sodium sulfate ($Na_2SO_4$).

9. The process of claim 8, wherein the concentration $C_f(B)$ of sodium sulfate ($Na_2SO_4$) is at least 20 g/kg.

10. The process according to claim 1, wherein the stream (A) is taken out from a sodium carbonate crystallizer selected from the group consisting of: a sodium carbonate anhydrous crystallizer, a sodium carbonate monohydrate crystallizer, a sodium carbonate heptahydrate crystallizer, a sodium carbonate decahydrate crystallizer, a sodium sesquicarbonate crystallizer, a wegscheiderite crystallizer, and any combination thereof.

11. The process according to claim 10, wherein the sodium carbonate crystallizer is fed with a sodium carbonate solution comprising sodium carbonate and at least one impurity consisting of an alkaline metal water-soluble salt at a concentration $C_0$, and wherein the ratio $C_f(B)/C_0$ of the at least one impurity is at least 14.

12. The process according to claim 1, wherein the sodium carbonate from the stream (A) derives partly or totally from trona recovered by mechanical mining or by solution mining.

13. The process according to claim 1, wherein the stream (A) derives partly or totally from tailings pond solids comprising sodium carbonate.

14. The process according to claim 1, wherein the stream (A) is an aqueous solution comprising sodium carbonate.

15. The process according to claim 1, wherein at step d), the optional gas (H) is a gas comprising at least 20 volume % $CO_2$ expressed as dry gas.

16. The process according to claim 1, wherein the step b) is operated at a temperature of at least 20° C.

17. The process according to claim 1, further comprising:
   optionally washing the crystals (F) comprising sodium bicarbonate crystals to produce optionally-washed crystals comprising sodium bicarbonate, and
   drying the crystals (F) comprising sodium bicarbonate crystals or the optionally-washed crystals comprising sodium bicarbonate.

18. The process according to claim 1, further comprising:
optionally washing the crystals (F) comprising sodium bicarbonate crystals to produce optionally-washed crystals comprising sodium bicarbonate, and
calcining the crystals (F) comprising sodium bicarbonate crystals or the optionally-washed crystals comprising sodium bicarbonate into calcined crystals comprising sodium carbonate.

19. The process according to claim 1, further comprising:
disposing of the remainder (I) of the stream (B) or the part (J) of the mother liquor (G) or a part (L) of a mother liquor (K) produced when said aqueous mother liquor (G) is debicarbonated, in a solution mining cavity or a mined out cavity or in a deep well injection; or,
recycling the remainder (I) of the stream (B) or the part (J) of the mother liquor (G) or a part (L) of a mother liquor (K) produced when said aqueous mother liquor (G) is debicarbonated, in a solution mining cavity or a mined out cavity, and recovering a sodium carbonate aqueous solution from the solution mining cavity or from the mined out cavity wherein the recovered sodium carbonate aqueous solution comprises sodium chloride and/or sodium sulfate at a sodium chloride and/or sodium sulfate concentration less than the concentration of sodium chloride and/or the concentration of sodium sulfate in the remainder (I) or the part (J) or the part (L).

20. A process for the joint production of sodium carbonate and bicarbonate crystals, comprising:
in a first step introducing a sodium carbonate solution comprising sodium carbonate and at least one impurity consisting of an alkaline metal water-soluble salt into a sodium carbonate crystallizer;
producing a first aqueous suspension comprising sodium carbonate crystals;
subjecting the first aqueous suspension to a separation, in order to obtain crystals comprising sodium carbonate, which are valorized, and a mother liquor,
wherein a part of the mother liquor is taken out of the sodium carbonate crystallizer to constitute the sodium carbonate bearing stream (A) to be further processed according to the process for producing sodium bicarbonate of claim 1.

21. The process according to claim 1, wherein the stream (A) is a purge from a sodium carbonate monohydrate crystallizer.

* * * * *